July 9, 1963 W. P. ROWLAND 3,096,545
RESILIENT SPACER FOR PRESS-FINISHING OF PLASTIC SHEET
Filed July 20, 1960
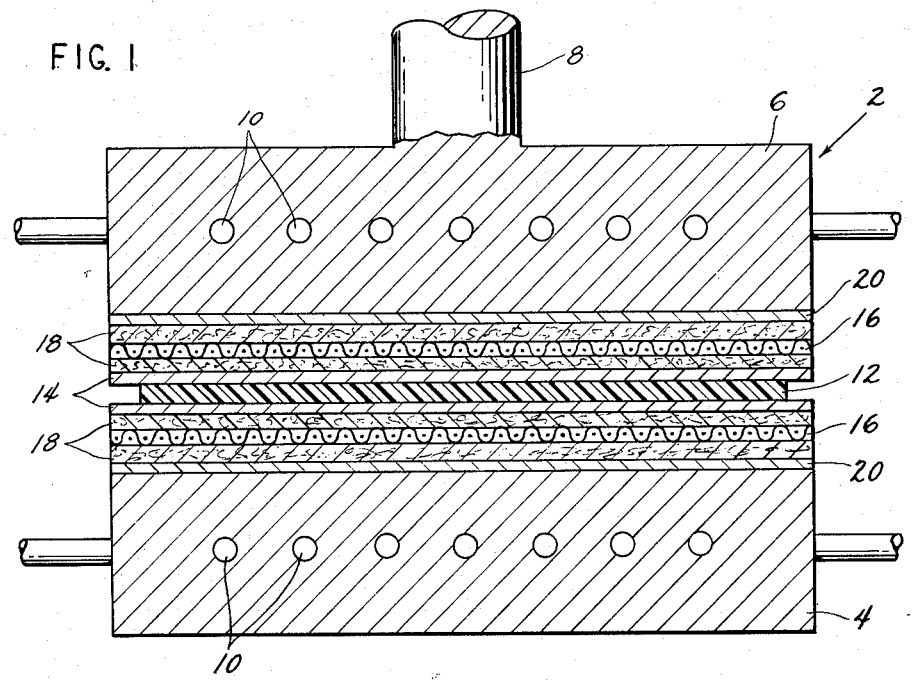
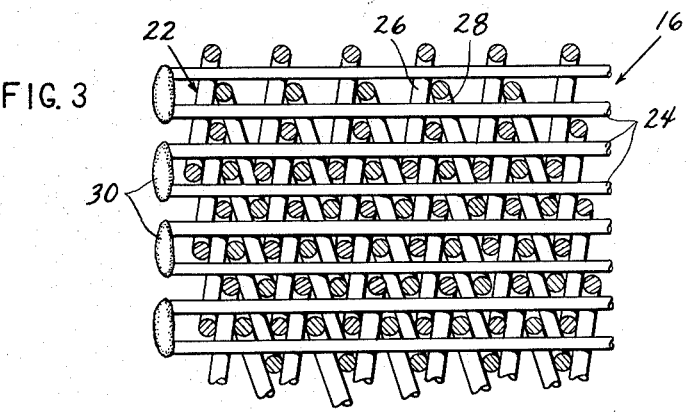
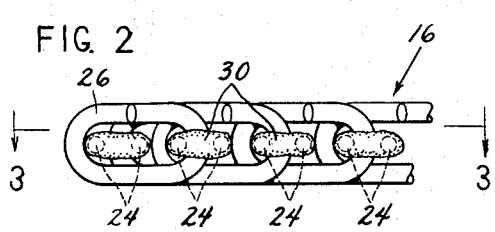
INVENTOR.
WILLIAM P. ROWLAND
BY
Lindsey, Prutzman & Hayes
ATTORNEYS

United States Patent Office 3,096,545
Patented July 9, 1963

3,096,545
RESILIENT SPACER FOR PRESS-FINISHING OF PLASTIC SHEET
William P. Rowland, Southington, Conn., assignor to Rowland Products, Inc., Kensington, Conn., a corporation of Connecticut
Filed July 20, 1960, Ser. No. 44,155
3 Claims. (Cl. 18—17)

The present invention relates to the surface finishing and lamination of plastic sheet, and more particularly to a method and means for supporting the plastic sheet and its finishing or laminating plates in a heated press.

Plastic sheet is frequently provided with a desired surface finish by placing it between metal plates and then applying heat and pressure sufficient to soften the surfaces of the sheet and to cause the surfaces to assume the finish defined by the metal plates. For example, highly polished steel plates are used for providing polished surfaces on the sheet and suitably contoured plates are provided for embossing the sheet. In laminating, several sheets of plastic are bonded together by placing them between metal plates and then applying heat and pressure sufficient to activate the overlying surfaces of the sheets to develop adhesion therebetween. It is customary to employ cardboard, rubber and synthetic sheets to space the metal plates and plastic sheet from the heated platens of the press which sheets being compressible or deformable support the assembly so that the pressure is generally distributed across the surface of the sheet despite gauge variation in the sheet or contours in the finishing and laminating plates.

The term "press finishing" as used herein includes both surface finishing and lamination of plastic sheet in a heated press.

Because of the temperatures utilized and the pressures, which vary between about 50–1000 p.s.i., the conventional spacers very rapidly deteriorate and lose resiliency. For example, the cardboard spacers most commonly employed in the industry are only usable for one to three cycles in such press operation. In addition to the cost of such constant replacement of conventional spacers, variations in compressibility of the spacers are undesirable for obtaining uniformly finished sheets.

It is an object of the present invention to provide a spacer for press finishing of plastic sheet which provides uniform resiliency and which is highly durable and unaffected by the heat and pressure of the press.

A further object is to provide a novel finishing assembly for press finishing of plastic sheet wherein the plastic sheet and finishing plates are supported and spaced from the platens by a highly durable and uniformly resilient member which has controllable deflection.

Still another object is to provide a spacer member of the aforementioned type which has characteristics of low heat-transmission.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a diagrammatic side section of a platen press containing a single polishing assembly and employing the resilient spacers of the present invention;

FIG. 2 is a fragmentary and elevational view of a resilient spacer; and

FIG. 3 is a fragmentary section along the line 3—3 of FIG. 2.

It has now been found that a resilient and highly durable spacer for press-finishing of plastic sheet is provided by a woven metallic pad having substantial rigidity and yet possessing the resiliency to deflect sufficiently under pressure to permit localized adjustment of the pressure on the plastic sheet without permanent deformation of the pad.

Referring to FIG. 1 of the drawings, a platen press 2 for polishing plastic sheet is diagrammatically illustrated and is comprised of a lower platen 4 and an upper platen 6 which is movable by the shaft 8 relative to the bottom platen 4. Both platens 4 and 6 are heated by steam passing through the conduits 10 which are spaced throughout the body thereof to supply substantially uniform heat over the surface, or, in other types of platens, by electric heating elements disposed therein.

The plastic sheet 12 is positioned between surface finishing plates 14 and the finishing plates 14 are spaced from the platens 4 and 6, in the illustrated embodiment, by a series of elements, each of which series essentially contains a woven metallic pad 16 so as to resiliently space the finishing plates 14 and plastic sheet 12 from both top and bottom platens.

Although the woven pads 16 may be utilized alone in conjunction with the assembly of plastic sheet and finishing plates, it is preferable to employ one or more flexible insulating sheets 18, such as cardboard, on either side of the pads 16 so as to reduce the celerity of heat transmission and also to prevent marring of the finishing plates 14 and the surfaces of the platens 4 and 6. In one form of the invention, the woven metallic pad 16 is provided with an insulating material on one or both surfaces to provide a unitary structure, most conveniently by adhesively bonding a suitable plastic or asbestos material to the pad.

Metal carrying plates 20 are also desirably employed for stacking and handling the woven pad and insulating sheet assemblies in advance of placing them in the platen press.

When several sheets are to be finished simultaneously in the press as in the case of thinner gauge plastic sheeting, a series formed by alternating plastic sheets with finishing plates is spaced and supported as illustrated for the single unit in FIG. 1, although it may occasionally be desirable to utilize a woven pad 16 between one or more series of plates and plastic sheet.

A preferred construction for the woven pad is illustrated in detail in FIGS. 2 and 3. Looking at the topmost portion of FIG. 2, a very high tensile strength wire is woven spirally about three spaced parallel extending reinforcing rods 24 to provide a coil 26 having a series of closely connected unit helices of generally oval configuration with their major axes lying in the lateral dimension of the mat. The next adjacent coil 28 of the weave alternates in direction of spiral and is of the same configuration, and this pattern is repeated throughout the pad. The ends of pairs of reinforcing rods 24 are secured together as at 30 by welding or other means so as to lock the mesh in form assembly.

The rods 24 are spaced apart sufficiently to provide a limited clearance between the outside of the coils and the next adjacent rods, and the inside dimension of the individual helices is greater than the diameter of the reinforcing rods so as to provide clearance in the vertical direction. When pressure is applied to the pad, the helices of the coils elongate and the coils are compressed in the vertical direction to provide the desired resilient deflection.

As shown in the drawings, the weave is one which provides a very close mesh having openings smaller than the diameter of the wire 22 so as to provide high density and very high tensile strength in the pad. The alternating sectional compound pattern of the weave insures substantial freedom from longitudinal stretching or retraction in width, thus eliminating any tendency towards warpage.

The exact dimensioning for the weave and materials selected will generally vary with the pressures to be encountered and the desired degree of deflection. It has been found, however, that the pad should provide a deflection on the order of 0.015–0.045 inch during operation of the press, and preferably 0.025–0.035 inch. Generally, a pad having a deflection on the order of 0.015–0.045 inch at 300–800 p.s.i. will be satisfactory for most pressures normally encountered in commercial operation.

As a specific example of a woven pad which has proven highly satisfactory in press polishing at pressures of about 300–800 p.s.i., reinforcing rods of 0.028 inch diameter are woven into a mat with electrocoated steel wire of 0.030 inch diameter. The wire is a high carbon steel alloy wire having a tensile strength of about 300,000 p.s.i. The elongate or lateral dimension of the oval helices of the coil (outside) is about 0.215 inch and the vertical or narrow dimension (outside) of the helices is about 0.130 inch. The weave contains 114 helices in the spiral wire per foot across the fabric and 192 rods per foot of length. Woven pads made as above have been used for hundreds of cycles without any evidence of wear, deterioration or loss of resiliency.

From the foregoing description, it can readily be appreciated that the woven resilient pads of the present invention are economical, durable and highly efficient in the spacing and supporting of plastic sheet in press-finishing operations for plastic sheet. By means of these resilient woven pads, relatively inexpensive cardboard sheets can be used simply as means for slowing the heat transmission from the platens to the sheet for 30 cycles or more, or more durable synthetics having little or no resiliency can be employed.

As will be apparent to persons skilled in the art, various modifications and adaptations of the structure above described will become readily apparent without departure from the spirit and scope of the invention, the scope of which is defined in the appended claims.

I claim:

1. In apparatus for press finishing plastic sheet of the type having a pair of heated platens movable relative to each other and a pair of finishing plates to apply heat and pressure to plastic sheet received between said finishing plates, the combination therewith of resilient spacing means between the finishing plates and platens for resiliently supporting the finishing plates and applying substantially uniform pressure across the surface of the sheet comprising resilient pads of closely woven steel mesh having a deflection on the order of 0.015 to 0.045 inch at pressures of about 300 to 800 p.s.i., said mesh having spaced parallel reinforcing rods and helical coils of wire woven about said rods, the loops of said coils having a generally oval configuration with the longer dimension disposed laterally of and encircling a plurality of rods, said mesh being dimensioned to provide close support between said rods and coils for a close weave and to permit limited elongation of the oval loops during operation of the apparatus.

2. The combination in accordance with claim 1 wherein mats of flexible material having low heat transmission are disposed between the finishing plates and resilient pads.

3. An assembly for press finishing plastic sheet in a heated platen press comprising a pair of finishing plates for receiving plastic sheet therebetween, and resilient pads of closely woven steel mesh on the outer sides of said finishing plates, said pads having high tensile strength and a deflection on the order of 0.015 to 0.045 inch during operation of the press, said mesh having spaced parallel reinforcing rods and helical coils of wire woven about said rods, the loops of said coils having a generally oval configuration with the longer dimension disposed laterally of the pad and encircling a plurality of rods, said mesh being dimensioned to provide close support between said rods and coils for a close weave and to permit limited deflection, said reinforcing rods being spaced apart to provide clearance between the outside of the loops and the next adjacent rod for limited elongation of the oval loops of the coils during compression in operation of the press, the narrow dimension of the loops providing clearance between the encircled reinforcing rods and the inside of the loop to permit limited deflection.

References Cited in the file of this patent

UNITED STATES PATENTS

| | | |
|---|---|---|
| 1,444,253 | Lee | Feb. 6, 1923 |
| 1,887,550 | Fix et al. | Nov. 15, 1932 |
| 1,911,296 | Watkins | May 30, 1933 |
| 2,268,477 | Elmendorf | Dec. 30, 1941 |
| 2,292,663 | Scherfel | Aug. 11, 1942 |
| 2,869,858 | Hartwell | Jan. 20, 1959 |
| 2,874,751 | Norton | Feb. 24, 1959 |